US012651396B2

(12) United States Patent　　　　(10) Patent No.:　US 12,651,396 B2

Tsai et al.　　　　　　　　　　　　(45) Date of Patent:　　　Jun. 9, 2026

(54) SKELETON CORRECTION METHOD OF AVATAR, VIRTUAL REALITY SYSTEM, AND COMPUTER-READABLE MEDIUM

(71) Applicant: Wistron Corporation, New Taipei City (TW)

(72) Inventors: Ping Chen Tsai, New Taipei City (TW); Yuan Hung Chen, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 270 days.

(21) Appl. No.: 18/336,962

(22) Filed: Jun. 17, 2023

(65) Prior Publication Data

US 2024/0355026 A1　　Oct. 24, 2024

(30) Foreign Application Priority Data

Apr. 20, 2023　(TW) ................................. 112114686

(51) Int. Cl.
　　*G06T 13/40*　　　(2011.01)
　　*G06T 19/00*　　　(2011.01)
(52) U.S. Cl.
　　CPC .............. *G06T 13/40* (2013.01); *G06T 19/00* (2013.01)
(58) Field of Classification Search
　　None
　　See application file for complete search history.

(56) References Cited

U.S. PATENT DOCUMENTS

| | | | |
|---|---|---|---|
| 8,803,889 B2 | 8/2014 | Perez et al. | |
| 9,378,589 B2 * | 6/2016 | Kim ....................... | G06T 13/40 |
| 9,861,886 B2 | 1/2018 | Perez et al. | |
| 10,984,575 B2 | 4/2021 | Assouline et al. | |
| 11,557,075 B2 | 1/2023 | Assouline et al. | |

(Continued)

FOREIGN PATENT DOCUMENTS

| | | |
|---|---|---|
| CN | 102596340 | 10/2014 |
| CN | 113383369 | 9/2021 |

(Continued)

OTHER PUBLICATIONS

Ahuja et al. , "Pose-on-the-Go: Approximating User Pose with Smartphone Sensor Fusion and Inverse Kinematics", (Year: 2021).*

(Continued)

*Primary Examiner* — Hilina K Demeter

(74) *Attorney, Agent, or Firm* — JCIPRNET

(57)　　　　　ABSTRACT

Disclosed are a skeleton correction method of avatar, a virtual reality system, and a computer-readable medium. In the method, the first skeleton information is obtained. The first type joint is estimated according to the second type joint of the first skeleton information. The second skeleton information is obtained. The first and second type joints of the second skeleton information are determined based on an image. The first skeleton information is compared with the second skeleton information to obtain a compared result. The first skeleton information is fused with the second skeleton information according to the comparison result to modify the position of the first type joint of the first skeleton information. Accordingly, the accuracy of tracking the skeleton is improved.

18 Claims, 10 Drawing Sheets

(56) References Cited

U.S. PATENT DOCUMENTS

| | | | | |
|---|---|---|---|---|
| 2010/0238168 | A1* | 9/2010 | Kim | G06T 7/20 |
| | | | | 382/154 |
| 2010/0302257 | A1 | 12/2010 | Perez et al. | |
| 2010/0325590 | A1* | 12/2010 | Homma | G06F 3/0346 |
| | | | | 715/863 |
| 2014/0320508 | A1 | 10/2014 | Perez et al. | |
| 2015/0193686 | A1* | 7/2015 | Chakravarty | G06F 21/32 |
| | | | | 706/48 |
| 2015/0379335 | A1* | 12/2015 | Marlow | G06T 7/251 |
| | | | | 382/203 |
| 2016/0232676 | A1* | 8/2016 | Baek | G06T 7/251 |
| 2017/0032055 | A1* | 2/2017 | Eisemann | G06F 30/17 |
| 2017/0032579 | A1* | 2/2017 | Eisemann | G06T 17/205 |
| 2019/0213792 | A1* | 7/2019 | Jakubzak | G06F 3/017 |
| 2020/0193866 | A1* | 6/2020 | Kubota | G09B 19/0038 |
| 2020/0218365 | A1 | 7/2020 | Todorov et al. | |
| 2020/0250874 | A1* | 8/2020 | Assouline | G06N 3/08 |
| 2020/0388052 | A1* | 12/2020 | Fukasawa | G06T 19/00 |
| 2021/0019507 | A1* | 1/2021 | Brookshire | G06V 10/82 |
| 2021/0209825 | A1 | 7/2021 | Assouline et al. | |
| 2022/0101588 | A1* | 3/2022 | Garofalo | G06F 3/014 |
| 2023/0090086 | A1 | 3/2023 | Assouline et al. | |

FOREIGN PATENT DOCUMENTS

| | | |
|---|---|---|
| CN | 114782645 | 7/2022 |
| JP | 2023035981 | 3/2023 |
| KR | 20210020499 | 2/2021 |
| TW | 202026846 | 7/2020 |

OTHER PUBLICATIONS

Tsai et al. , "Enhancing Accuracy of Human Action Recognition System using Skeleton Point Correction Method", (Year: 2022).*

Karan Ahuja et al., "Pose-on-the-Go: Approximating User Pose with Smartphone Sensor Fusion and Inverse Kinematics", Proceedings of the 2021 CHI Conference on Human Factors in Computing Systems, May 6, 2021, pp. 1-12, No. 9.

Elhassan Makled et al., "Investigating User Embodiment of Inverse-Kinematic Avatars in Smartphone Augmented Reality", 2022 IEEE International Symposium on Mixed and Augmented Reality (ISMAR), Oct. 17, 2022, pp. 666-675.

Shuhei Munakata et al., "Development of Posture Evaluation System for Yoga Support", ITE Technical Report, with English abstract, Oct. 20, 2021, pp. 43-46, vol. 45, No. 31.

Raita Kawasaki et al., "Generation of Character Animation Holding a Tool with Its Both Hands by Using Three 6DOF Trackers", Information Processing Society of Japan (IPSJ), with English abstract, Aug. 15, 2004, pp. 2078-2086, vol. 45, No. 8.

Masaki Hayashi et al., "By Applying the Two-Step Poselets-Regressor Estimating Human Poses from Team Sports Videos", The 22nd Symposium on Sensing via Image Information (SSII2016), with English abstract, Jun. 8, 2016, pp. 1-10.

* cited by examiner

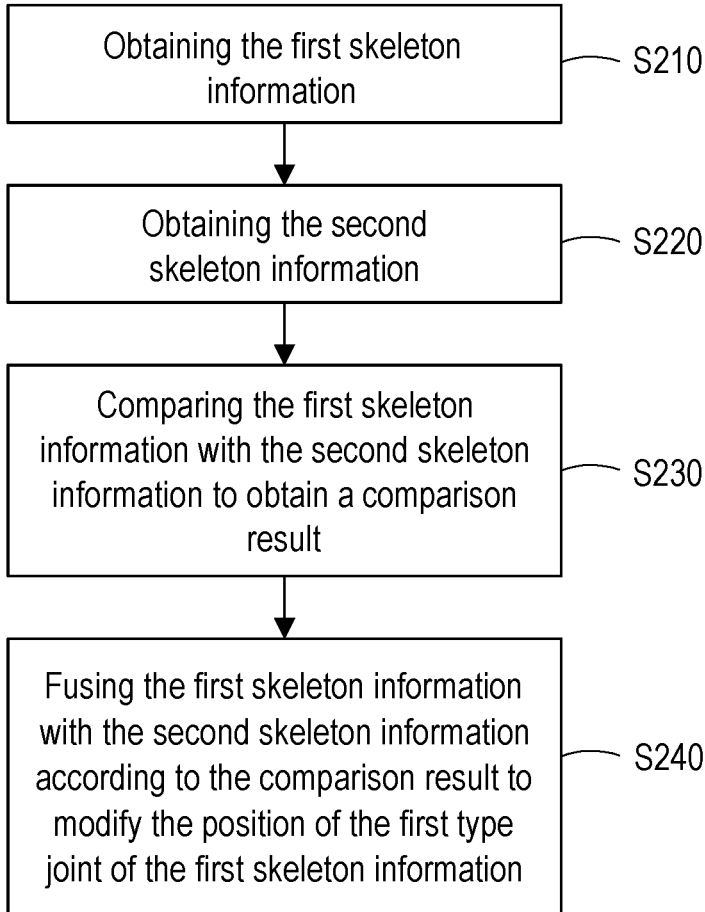

Obtaining the first skeleton information — S210

Obtaining the second skeleton information — S220

Comparing the first skeleton information with the second skeleton information to obtain a comparison result — S230

Fusing the first skeleton information with the second skeleton information according to the comparison result to modify the position of the first type joint of the first skeleton information — S240

FIG. 2

$$\boldsymbol{p} = (x, y, z)$$

$$\boldsymbol{p}' = R\boldsymbol{p} = \begin{bmatrix} r_{11} & r_{12} & r_{13} \\ r_{21} & r_{22} & r_{23} \\ r_{31} & r_{32} & r_{33} \end{bmatrix} \begin{bmatrix} x \\ y \\ z \end{bmatrix}$$

SKELETON CORRECTION METHOD OF AVATAR, VIRTUAL REALITY SYSTEM, AND COMPUTER-READABLE MEDIUM

CROSS-REFERENCE TO RELATED APPLICATION

This application claims the priority benefit of Taiwan application serial no. 112114686, filed on Apr. 20, 2023. The entirety of the above-mentioned patent application is hereby incorporated by reference herein and made a part of this specification.

BACKGROUND

Technical Field

The present disclosure relates to a virtual reality (VR) technology, and in particular to a skeleton correction method of an avatar, a virtual reality system and a computer-readable medium.

Description of Related Art

With the rapid development of science and technology, metaverse-related products are accessible everywhere, and VR head-mounted displays as the entrance interface of metaverse have become increasingly popular. A user wearing a VR head-mounted display (HMD) is able to immerse himself in a virtual world. However, the feeling of "immersion" brought by the HMD is limited to the user's visual and auditory senses. That is, most users only experience the feeling of immersion with their upper body but not the entire body.

When a user wears a VR HMD and enters a VR social platform, it is necessary to create an avatar to represent himself/herself. However, current technology is only able to display the upper body of the virtual avatar. While the camera of the VR HMD is able to track the positions of the head and hands and estimate the positions of the arms and chest, the VR HMD does not know the position of the user's legs and has a limited tracking range. For example, the abdomen or other obstructions may block the view of the camera, and the user might tilt or turn the head around so the camera cannot capture the lower body. In order to solve this problem, current positioning technologies for VR HMD may be divided into two categories, one is outside-in, and the other is inside-out.

Although using the outside-in technology is able to provide a more accurate and broader tracking effect, the system is complex and expensive and is generally suitable for enterprise. For example, a tracker strapped to limbs or objects (e.g., tennis rackets) requires to be provided with a positioning device, the system is complex and ineffective. Now a full-body motion capture suit has been developed. Although the suit is able to achieve a good motion-capturing effect, the cost is expensive.

Because the inside-out technology is able to provide a positioning method without a positioning device, it is more suitable for daily entertainment and scenes that are moving, thereby increasing the chance of use, and the system is relatively simple and the cost is low. However, the motion-capturing effect is not accurate. Nevertheless, companies have come up with solutions. For example, the movement of other parts may be estimated based on the head movement detected by the HMD. However, it is still impossible to accurately estimate every movement of a specific user, and consequently the movements reproduced by the avatar will look unnatural. In addition, a certain level of resource is required to collect large amounts of walking pattern data.

In order to popularize VR social networking and promote VR, it is required to make VR more easily accessible and present physical performance that looks more real.

SUMMARY

Embodiments of the present disclosure provide a skeleton correction method of an avatar, a virtual reality system, and a computer-readable medium, and provide a new system architecture to improve tracking capabilities.

The skeleton correction method of an avatar in an embodiment of the present disclosure includes (but not limited to) the following steps: obtaining the first skeleton information, the first type joint of the first skeleton information is estimated according to the second type joint; obtaining the second skeleton information, the first type joint and the second type joint of the second skeleton information are determined based on an image; comparing the first skeleton information with the second skeleton information to obtain a comparison result; fusing the first skeleton information with the second skeleton information according to the comparison result to modify the position of the first type joint of the first skeleton information.

The virtual reality system in an embodiment of the present disclosure includes (but is not limited to) an image capturing device, a sensor and a processor. The image capturing device is configured to capture images. The sensor is configured to detect a motion status. The processor communicates with the image capturing device and the sensor. The processor is configured to perform the following steps: obtaining first skeleton information, the first type joint of the first skeleton information is estimated according to the second type joint, and the second type joint of the first skeleton information is determined based on the sensing data of the sensor; obtaining the second skeleton information, the first type joint and the second type joint of the second skeleton information are determined based on an image; comparing the first skeleton information with the second skeleton information to obtain a comparison result; fusing the first skeleton information with the second skeleton information according to the comparison result to modify the position of the first type joint of the first skeleton information.

The non-transitory computer-readable medium in an embodiment of the present disclosure loads program codes through a processor to perform the following steps: obtaining first skeleton information, the first type joint of the first skeleton information is estimated according to the second type joint; obtaining the second skeleton information, the first type joint and the second type joint of the second skeleton information are determined based on an image; comparing the first skeleton information with the second skeleton information to obtain a comparison result; fusing the first skeleton information with the second skeleton information according to the comparison result to modify the position of the first type joint of the first skeleton information.

Based on the above, in the skeleton correction method of an avatar, the virtual reality system and the computer-readable medium in the embodiments of the present disclosure, the skeleton information based on sensing data is compared with the skeleton information based on image, and skeleton information is modified according to the comparison result.

In order to make the above-mentioned features and advantages of the present disclosure more comprehensible, the specific examples below are described in detail in conjunction with the accompanying drawings.

BRIEF DESCRIPTION OF THE DRAWINGS

FIG. 2 is a flowchart of a skeleton correction method of an avatar according to an embodiment of the present disclosure.

DESCRIPTION OF THE EMBODIMENTS

Figure 1:
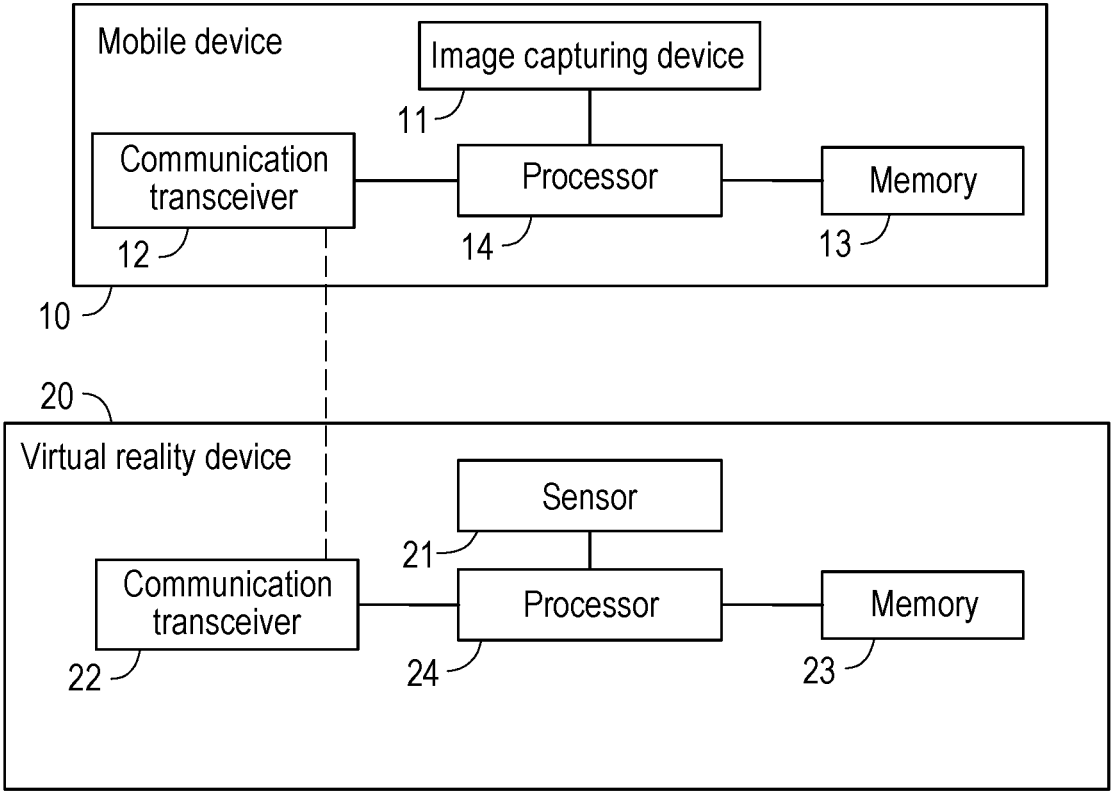
FIG. 1 is a block diagram of components of a virtual reality system according to an embodiment of the present disclosure.

FIG. 1 is a block diagram of components of a virtual reality system 1 according to an embodiment of the present disclosure. Please refer to FIG. 1, the virtual reality system 1 includes (but not limited to) a mobile device 10 and a virtual reality device 20.

The mobile device 10 may be a smart phone, a tablet computer, a notebook computer, an intelligent assistant device or a wearable device.

The mobile device 10 includes (but not limited to) an image capturing device 11, a communication transceiver 12, a memory 13 and a processor 14.

The image capturing device 11 may be a camera or a video camera. In an embodiment, the image capturing device 11 is configured to capture images within a specified field of view. In an application scenario, the image capturing device 11 takes pictures of a user wearing or holding a virtual reality device 20, a wearable device or a sensor.

The communication transceiver 12 may support, for example, the fourth generation (4G) or other generation mobile communication, Wi-Fi, Bluetooth, infrared, radio frequency identification (RFID), Ethernet, fiber optic network, or may be universal serial bus (USB), Thunderbolt or other communication transmission interfaces. In an embodiment, the communication transceiver 12 is configured to transmit or receive data with other electronic devices (e.g., virtual reality device 20, wearable device or sensor).

The memory 13 may be any type of fixed or removable random access memory (RAM), read-only memory (ROM), flash memory, hard disk drive (HDD), solid-state drive (SSD) or similar components. In an embodiment, the memory 13 is configured to store program codes, software modules, configuration configurations, data (such as images, skeleton information, sensing data, etc.) or files, and the embodiments thereof will be described in detail later.

The processor 14 is coupled to the image capturing device 11, the communication transceiver 12 and the memory 13. The processor 14 may be a central processing unit (CPU), a graphic processing unit (GPU), or other programmable general-purpose or special-purpose microprocessors, a digital signal processor (DSP), a programmable controller, a field programmable gate array (FPGA), an application-specific integrated circuit (ASIC), a neural network accelerator or other similar components or combinations of the above components. In an embodiment, the processor 14 is configured to execute all or part of the operations of the mobile device 10, and is able to load and execute various program codes, software modules, files and data stored in the memory 13. In some embodiments, the functions of the processor 14 may be realized by software or chips.

The virtual reality device 20 may be a head-mounted display (HMD), a handheld controller, a wearable sensor, a computing computer or a combination thereof.

The virtual reality device 20 includes (but not limited to) a sensor 21, a communication transceiver 22, a memory 23 and a processor 24.

The sensor 21 may be an image sensor, an inertial sensor, an accelerometer, a gyroscope, a magnetic sensor, a 6-axis or 9-axis motion sensor. In an embodiment, the sensor 21 is configured to detect motion status, and obtain sensing data such as image, intensity, speed, acceleration, orientation or other sensing data.

The implementation and functions of the communication transceiver 22, the memory 23, and the processor 24 may be derived from the descriptions of the communication transceiver 12, the memory 13, and the processor 14, respectively, and will not be repeated here.

In an embodiment, the processor 24 is configured to execute all or part of the operations of the virtual reality device 20, and is able to load and execute various program codes, software modules, files and data stored in the memory 23 (e.g., sensing data, skeleton information, or comparison results). In some embodiments, the functions of the processor 24 may be realized by software or chips.

In an embodiment, the sensor 21 may be separated from the main body of the virtual reality device 20. In an embodiment, the communication between separate devices or components may be realized through the communication transceivers 12 and 22, so that multiple devices and/or components can communicate with each other to complete signal or data transmission. For example, the virtual reality device 20 transmits the conversion coefficient to the mobile device 10. In another example, the mobile device 10 transmits skeleton information to the virtual reality device 20.

Hereinafter, various devices, components and modules in the virtual reality system 1 will be adopted to describe the method described in the embodiments of the present disclosure. Each process of the method may be adjusted according to the implementation situation, and is not limited thereto. It should also be noted that, according to different design requirements, the method described in the embodiments of the present disclosure may be implemented by one or both of the processor 14 or the processor 24. The processing/analyzing/computing results of the processor 14 and the processor 24 may be sent to the other through the communication transceiver 12 and the communication transceiver 22 respectively, and the subsequent procedures may be continued accordingly. Therefore, the data transmission between the execution body and the two devices will not be repeated below.

FIG. 2 is a flowchart of a skeleton correction method of an avatar according to an embodiment of the present disclosure. Referring to FIG. 2, the processor 14/24 obtains the first skeleton information (step S210). Specifically, the first skeleton information includes a first type joint and a second type joint. Depending on different target objects and application scenarios, the first type joints and the second type joints respectively correspond to different parts or joints of the target object, and the joints may also be called feature points.

Figure 3:
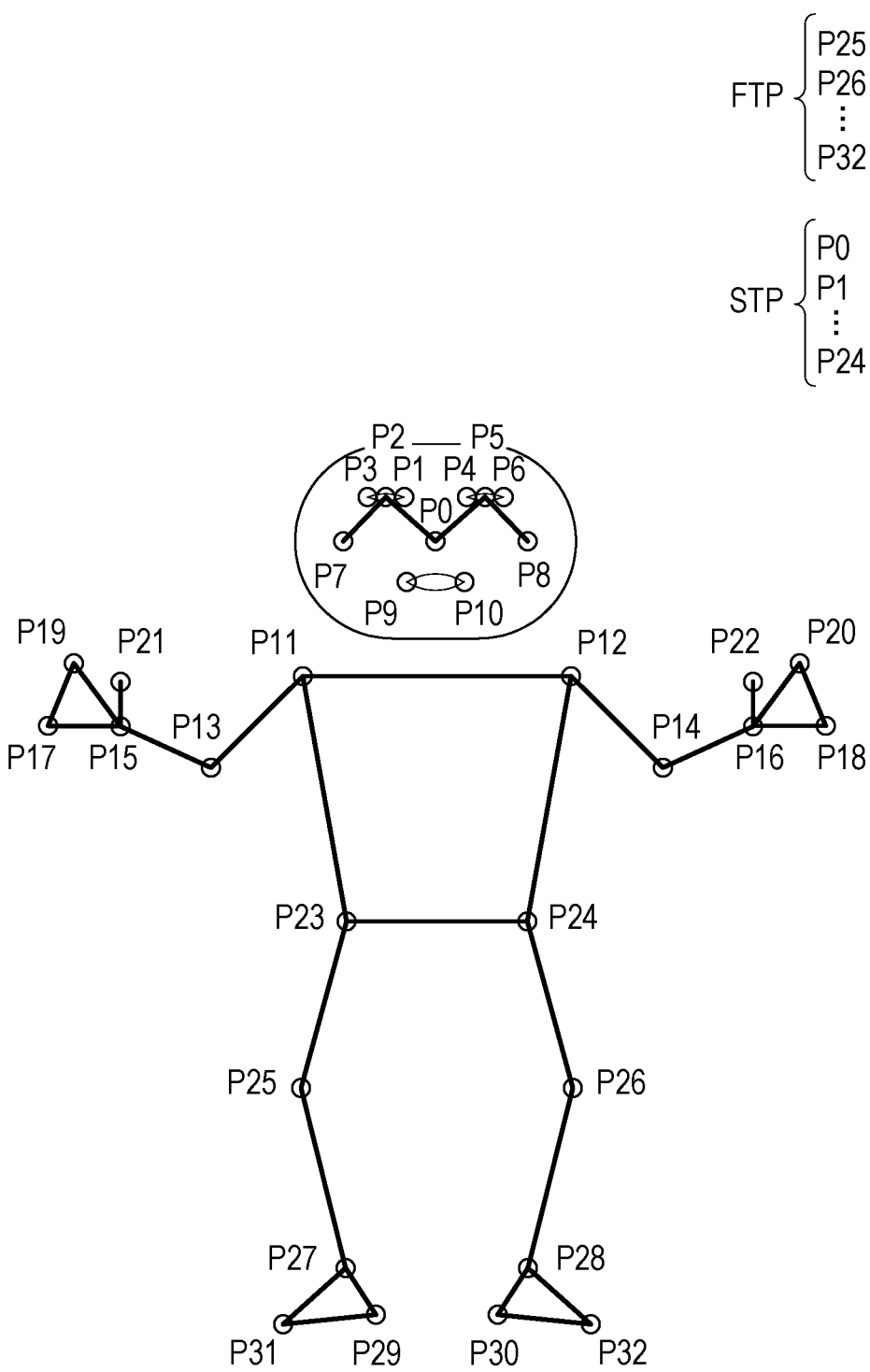
FIG. 3 is a schematic diagram of a skeleton joint according to an embodiment of the present disclosure.

For example, FIG. 3 is a schematic diagram of a skeleton joint according to an embodiment of the present disclosure. Please refer to FIG. 3, taking a human as an example, the processor 14/24 may define 33 skeleton joints P0~P32. The skeleton joint P0 corresponds to the nose, the skeleton joint P1 corresponds to the inside of the right eye, the skeleton joint P2 corresponds to the center of the right eye, the skeleton joint P3 corresponds to the outside of the right eye, and so on, and the details are not repeated here. If skeleton joints P0~P32 are divided into upper body and lower body, the skeleton joints P25~P32 may serve as the first type joint FTP, and the skeleton joints P0~P24 may serve as the second type joints STP. That is, the first type joint FTP corresponds to the lower body, and the second type joint STP corresponds to the upper body.

It should be noted that the classification of skeleton joints may still be changed depending on actual needs. In other embodiments, the skeleton joint may also be a key joint of a finger joint or a face. Also, there are many variations of skeletons such as short skeleton, lanky skeletons, or bulky skeletons. Therefore, the position and number of skeleton joints are not limited to the embodiment shown in FIG. 3.

The position of the first type joint of the first skeleton information is estimated by the second type joint. The second type joint is determined based on the sensing data of the sensor 21. That is to say, the sensing result of the sensor 21 is directed to the second type joint but not directed to the first type joint. The processor 14/24 may directly determine the position of the second type joint based on the sensing result of the sensor 21. For example, the sensing result of the inertial sensor on the HMD determines the movement information of the head, and the position of the head and its skeleton joint (for example, coordinates in three-dimensional space) may be determined accordingly. However, this movement information cannot be directly adopted to determine the position of the legs or their skeleton joints.

Figure 4:
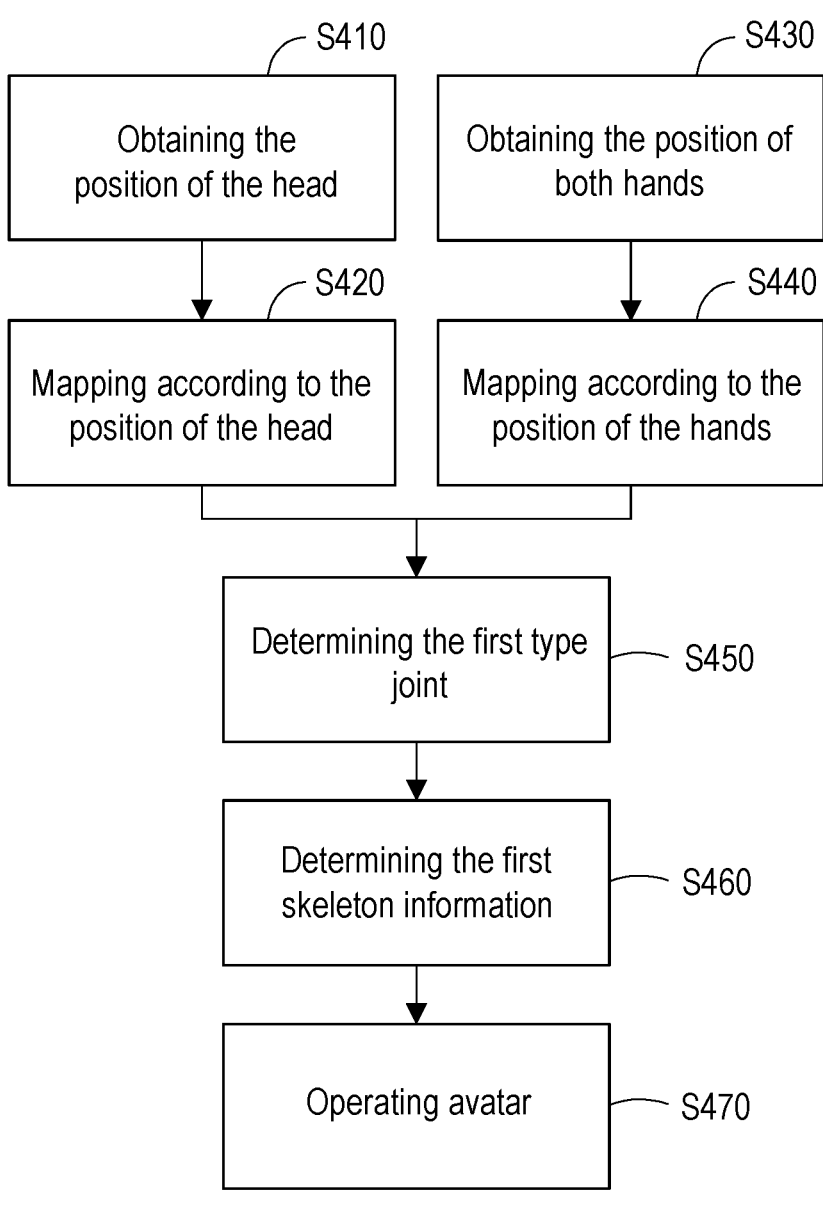
FIG. 4 is a flowchart of a method for obtaining first skeleton information according to an embodiment of the present disclosure.

FIG. 4 is a flowchart of a method for obtaining first skeleton information according to an embodiment of the present disclosure. Please refer to FIG. 4, the classification of first type joint and second type joint is shown in FIG. 3 as an example. The processor 14/24 may obtain the position of head according to the sensing data of the sensor 21 on the HMD (step S410). For example, the angular velocity, acceleration and magnetic direction obtained by the six-axis sensor determine the position and pose. The processor 14/24 may map skeleton joints such as neck, waist, and spine according to the position of head (step S420), such as the skeleton joints P0~P10 and P23~P24 in FIG. 3.

On the other hand, the processor 14/24 may obtain the position of both hands according to the sensing data of the sensor 21 on the handheld controller (step S430), and map skeleton joints such as arm, shoulder, elbow, etc. according to the position of the hands (step S440), such as the skeleton joints P11~P22 in FIG. 3. The skeleton joints obtained in steps S420 and S440 belong to the second type joint. It should be noted that the aforementioned steps take the sensors 21 on the head and both hands as an example, but the sensor 21 may be provided on the legs, chest or back, and the embodiment of the present disclosure does not limit the configuration position of the sensor 21.

Regarding the mapping of the skeleton joint, in an embodiment, the processor 14/24 may determine the position of one or more skeleton joints based on a given reference position (of the parent node) and inverse kinematics (IK). The parent-child hierarchy between skeleton joints may form body parts. For example: arms, head and neck, etc. By using IK to define the movement trajectory of various body parts and setting the limit, it is possible to ensure consistency of the movement trajectory on the real human body, such as bending, rotation angle, etc. The given reference position may be provided or determined through the sensing data of the sensor 21. Similarly, the processor 14/24 may also estimate the positions of the shoulders, upper body, head and other parts based on IK, and detailed description thereof will be omitted.

Figure 5:
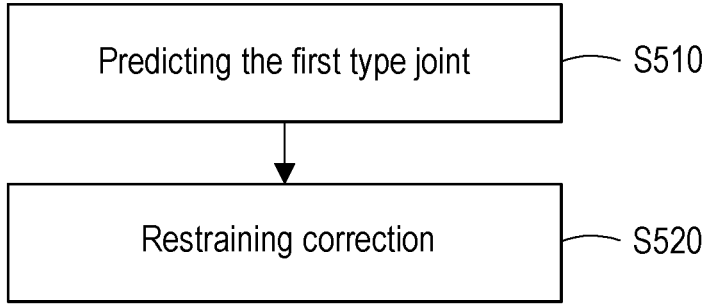
FIG. 5 is a flow chart of determining the skeleton of the lower body according to an embodiment of the present disclosure.

Next, the processor 14/24 may determine the first type joint (step S450). Specifically, FIG. 5 is a flow chart of determining the skeleton of the lower body according to an embodiment of the present disclosure. Referring to FIG. 5, the processor 14/24 may input the position of the second type joint into the Pose AI model (for example, BlazePose) or other models related to pose inference to predict the position of the first type joint (step S510). Next, the processor 14/24 may perform restrain correction on the position of the first type joint based on IK (step S520), so as to maintain the possibility and rationality of body movements, and then determine the position of the first type joint.

Referring to FIG. 4, the processor 14/24 determines the first skeleton information according to the positions of the first type joint and the second type joint (step S460). Taking FIG. 3 as an example, the first skeleton information includes the positions of all skeleton joints P0~P32 over the body. Next, the processor 14/24 may operate the avatar according to the first skeleton information (step S470), so that the pose of the avatar is the same as the first skeleton information.

However, since the position of the first type joint is generated through estimation, the accuracy of the position of the first type joint may be lower than that of the second type joint. In order to improve the accuracy, the embodiment of the present disclosure further refers to other skeleton information.

Referring to FIG. 2, the processor 14/24 obtains the second skeleton information (step S220). Specifically, the first type joint and the second type joint in the second skeleton information are determined based on the image of the image capturing device 11. This image may capture first type joint and second type joint. For example, the field of view of the image capturing device 11 includes the whole body of the person. For image-based positioning, the processor 14/24 may use machine learning techniques (for example, deep learning, artificial neural network (ANN) or support vector machine (SVM), etc. to identify the position in the skeleton joint in the image, so as to obtain the positions of the first type joint and the second type joint. For example, Pose AI model may be utilized to infer the position of objects in an image in space. However, there are many image-based positioning technologies, which are not limited in the embodiments of the present disclosure.

Referring to FIG. 2, the processor 14/24 compares the first skeleton information and the second skeleton information to generate a comparison result (step S230). Specifically, since the second skeleton information obtained based on the image may be incorrectly recognized, the position of the second type joint of the first skeleton information may be more accurate than the position of the second type joint of the second skeleton information. In order to verify whether the second skeleton information may serve as the reference, it is firstly possible to compare whether the first skeleton information matches the second skeleton information, that is, to verify the consistency between the two skeleton information.

In an embodiment, the processor 14/24 may obtain the first spatial position of the second type joint from the first skeleton information, and obtain the second spatial position of the second type joint from the second skeleton information. The first spatial position and the second spatial position may be coordinates or relative positions, that is, the positions of the skeleton joints; related description of steps S210 and S220 have already been provided, and will not be repeated here. Then, the processor 14/24 may then compare the first spatial position and the second spatial position, that is, it is compared whether the first spatial position matches the second spatial position. Since the position of the second type joint in the first skeleton information is more accurate than that of the first type joint, the position of the second type joint in the first skeleton information may serve as a reference to determine whether the two skeleton information match each other or are consistent with each other.

Figure 6:
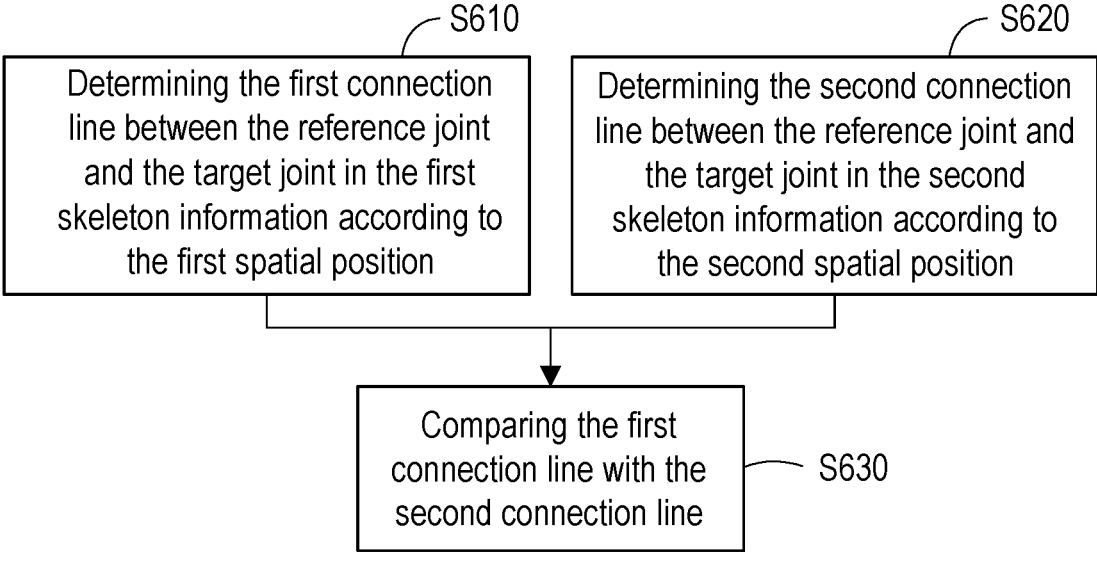
FIG. 6 is a flow chart of comparing skeleton information according to an embodiment of the present disclosure.

The second type joint includes one or more target joints. The target joints are, for example, left/right hand, left/right leg, head or other feature points. The comparison described above is comparison between the spatial positions of the target joints. FIG. 6 is a flow chart of comparing skeleton information according to an embodiment of the disclosure. Referring to FIG. 6, the processor 14/24 determines one or more first connection lines between the reference joint and one or more target joints in the first skeleton information according to the first spatial position (step S610). Reference joints are, for example, center of hip, neck, left/right knees, left/right hip, left/right elbows, left/right shoulders or other skeleton joints. The first connection line is the connection between the reference joint of the first skeleton information and one or more target joints, such as the connection line from the center of the hip to the hands and head.

The processor 14/24 may determine one or more second connection lines between the reference joint and one or more target joints in the second skeleton information according to the second spatial position (step S620). The second connection line is the connection between the reference joint of the second skeleton information and one or more target joints.

Next, the processor 14/24 may compare the first connection line with the second connection line (step S630). That is, it is compared whether the first connection line matches the second connection line, or whether the first connection line is consistent with the second connection line.

In an embodiment, one or more first connection lines respectively form one or more first vectors, and one or more second connection lines respectively form one or more second vectors. Compared with the connection lines, the vector further includes directionality, thereby assisting the processor 14/24 to understand the orientation of the connection lines between the plurality of joints (corresponding to the orientation of the body parts). The processor 14/24 may determine the similarity between the first vector and the corresponding second vector to determine whether the first vector of the first skeleton information matches the second vector of the second skeleton information.

Figure 7:
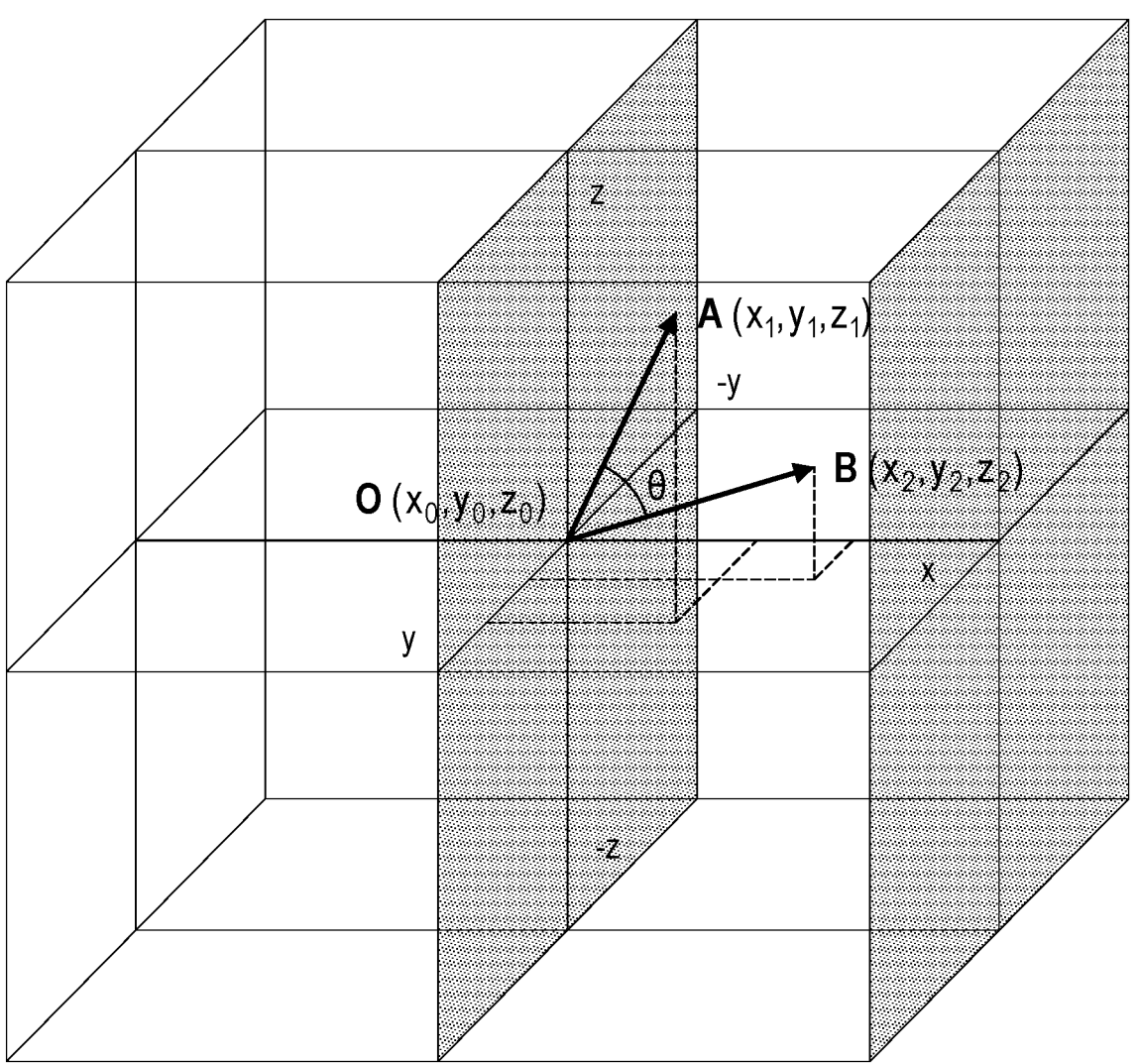
FIG. 7 is a schematic diagram of cosine similarity according to an embodiment of the present disclosure.

In an embodiment, the processor 12/24 may determine a cosine similarity between the first vector and the second vector. FIG. 7 is a schematic diagram of cosine similarity according to an embodiment of the present disclosure. Referring to FIG. 7, the coordinates of the reference joint O are $(x_0, y_0, z_0)$, the coordinates of the target joint A are $(x_1, y_1, z_1)$, and the coordinates of the target joint B are $(x_2, y_2, z_2)$. For example, the first type joint belongs to the lower body, the second type joint belongs to the upper body, the reference joint O is the hip center joint, and the target joints A and B may be left-hand joint, right-hand joint or head joint. The formula for cosine similarity is:

$$\cos(\theta) = \frac{\overrightarrow{OA} \cdot \overrightarrow{OB}}{\|\overrightarrow{OA}\| \, \|\overrightarrow{OB}\|} \tag{1}$$

In an embodiment, the processor 14/24 may determine the comparison result according to the comparison between the one or more first connection lines and the corresponding one or more second connection lines. For example, the comparison result is similarity. In other embodiments, the comparison result may also be difference, mean square error (MSE), root-mean-square error (RMSE) or least-mean-square error (LMSE).

In an embodiment, the processor 14/24 may convert the second skeleton information into the coordinate system to which the first skeleton information belongs. Since the second skeleton information includes the position obtained based on the image, the original position of the skeleton joint belongs to the camera coordinate system. It is also possible that the coordinate systems used by the mobile device 10 and the virtual reality device 20 are different. In order to compare the first skeleton information with the second skeleton information, the processor 14/24 may perform coordinate system conversion.

Figure 8:
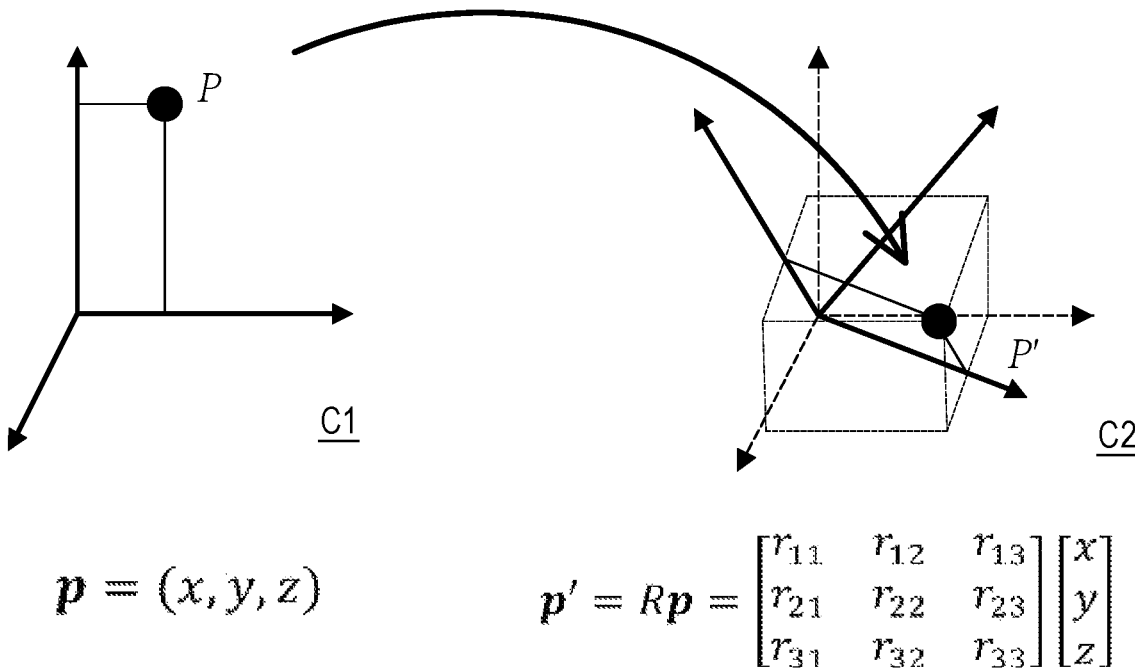
FIG. 8 is a schematic diagram of coordinate system conversion according to an embodiment of the present disclosure.

FIG. 8 is a schematic diagram of coordinate system conversion according to an embodiment of the present disclosure. Referring to FIG. 8, the skeleton joint of the second skeleton information belongs to the coordinate system C1, and the skeleton joint of the first skeleton information belongs to the coordinate system C2. The coordinate P of the skeleton joint in the second skeleton information is (x, y, z). After the skeleton joint P is mapped to the coordinate system C2 by the (coordinate system/base) conversion coefficient R, a new coordinate P' is obtained:

$$P' = RP = \begin{bmatrix} r_{11} & r_{12} & r_{13} \\ r_{21} & r_{22} & r_{23} \\ r_{31} & r_{32} & r_{33} \end{bmatrix} \begin{bmatrix} x \\ y \\ z \end{bmatrix} \tag{2}$$

$r_{11} \sim r_{13}$, $r_{21} \sim r_{23}$, $r_{31} \sim r_{33}$ are the elements of the conversion coefficient R in matrix form.

In an embodiment, the processor 14/24 may determine the coordinate correspondence between the first skeleton information and the second skeleton information under the reference pose. The coordinate conversion of the second skeleton information is based on the corresponding relationship of the coordinates. That is to say, the coordinates on the second skeleton information may be mapped to the coordinate system to which the first skeleton information belongs according to the corresponding relationship between the coordinates. The corresponding relationship between the coordinates is, for example, the aforementioned (coordinate system/base) conversion coefficient R or other coordinate conversion functions. The reference pose is, for example, T pose or Phi pose. For example, FIG. 9A is a schematic diagram of a T pose according to an embodiment of the present disclosure, and FIG. 9B is a schematic diagram of a Phi pose according to an embodiment of the present disclosure.

Figure 9A:
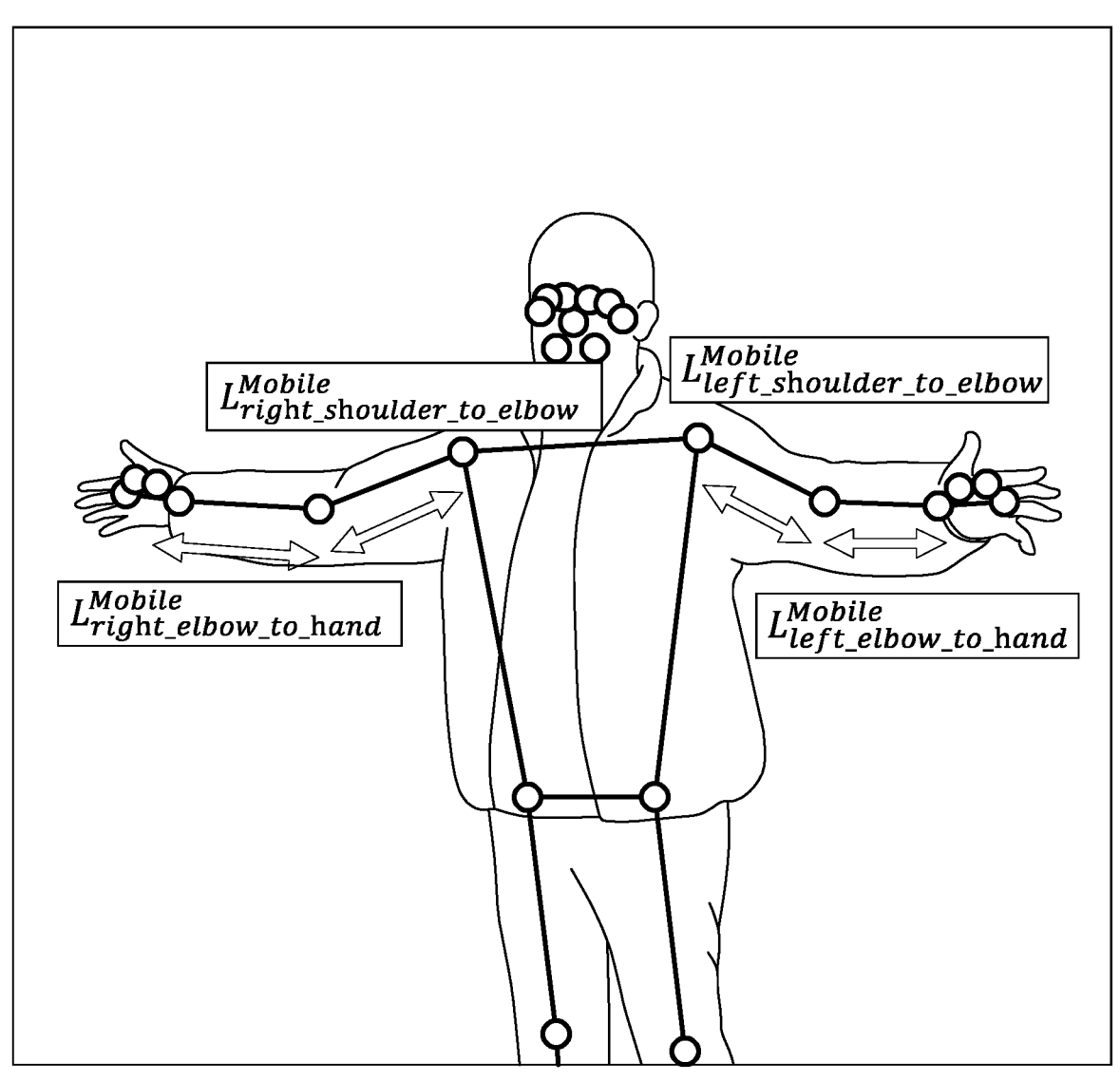
FIG. 9A is a schematic diagram of a T pose according to an embodiment of the present disclosure.
Figure 9B:
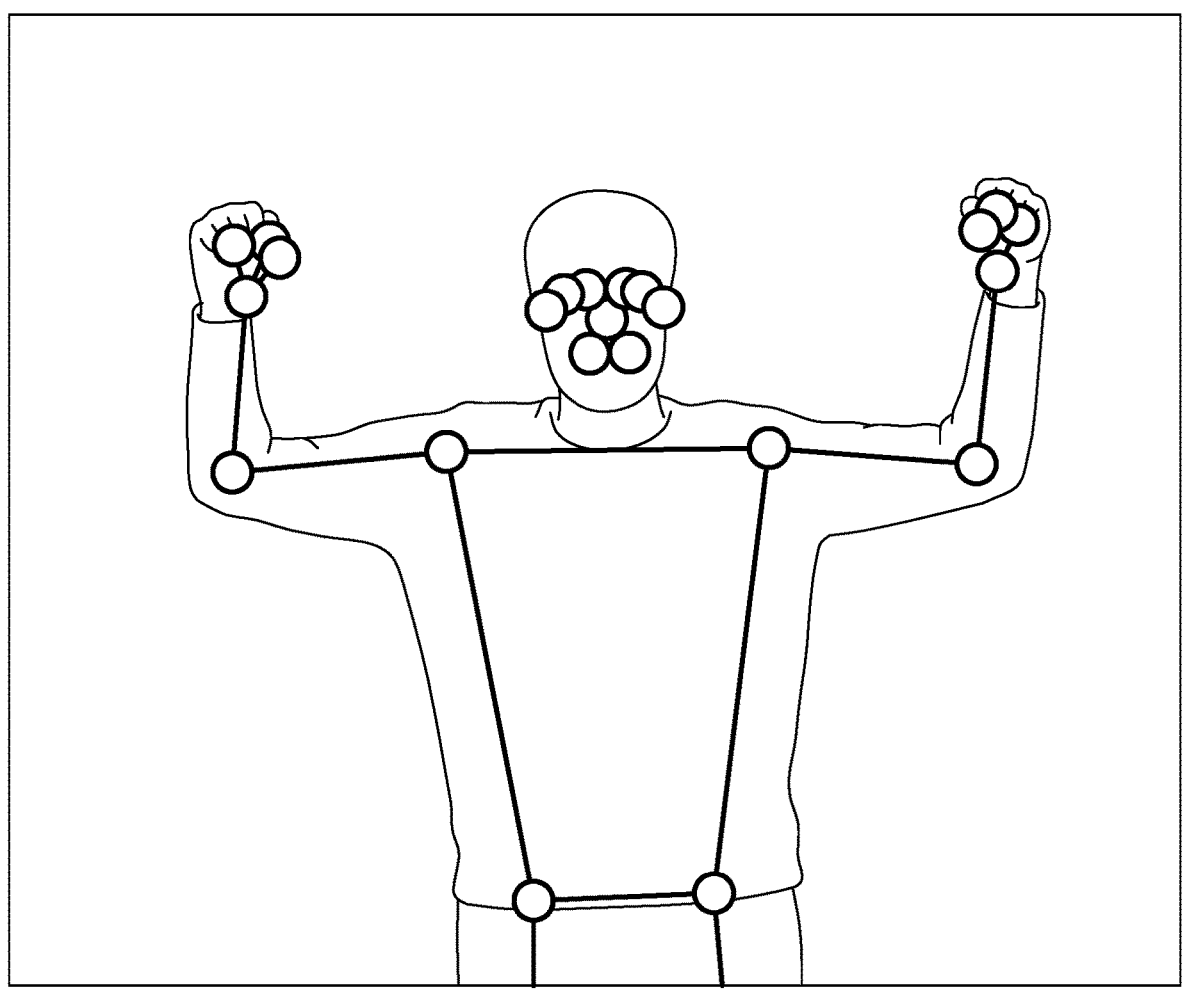
FIG. 9B is a schematic diagram of a Phi pose according to an embodiment of the present disclosure.

The step of determining the corresponding relationship between the coordinates is exemplified in FIG. 9A. The mobile device 10 or the virtual reality device 20 may prompt the user to pose as a T pose as shown in FIG. 9A through video or sound. The processor 14/24 may define reference joint (e.g., hip center) and target joint (e.g., head, left hand, and/or right hand). After the processor 14/24 obtains the second skeleton information corresponding to the T pose, it is possible to obtain other second vectors such as hip center to head, hip center to left hand, hip center to right hand, and so on. The processor 14/24 may normalize the one or more second vectors and determine the (coordinate system/base) conversion coefficient accordingly:

$$R = I + [v] \times [v]^2 \times \frac{1-c}{s^2} \tag{1}$$

I is the unit matrix, v is the product of two vectors, [v] represents the skew-symmetric cross-product matrix, s represents the sine of the angle between the two vectors, and c represents the cosine of the angle between the two vectors.

It should be noted that, in some application scenarios, there may be errors in inferring coordinate points in three-dimensional space by using the machine learning model. Under the circumstances, the Kabsch algorithm or other algorithms for optimizing the rotation matrix may be adopted to search for the optimization for the transformation matrix through multiple sets of vector pairs, and extend to more sets of vector pairs depending on the computing power. In addition, image-based skeleton information extracts 3D information from 2D images. In order to reduce the errors caused by optical effects, it is possible to effectively reduce optical errors by using this reference pose. However, the reference pose is not limited to T pose or Phi pose.

In an embodiment, before comparing the first skeleton information with the second skeleton information, the processor 14/24 may determine whether the second skeleton information has undergone coordinate conversion and/or whether coordinate correspondence or (coordinate system/base) conversion coefficient. If the coordinate conversion and/or coordinate correspondence or conversion coefficient have not been obtained, these operations may be performed first and then the skeleton information may be compared subsequently.

Please refer to FIG. 2, the processor 14/24 fuses the first skeleton information and the second skeleton information according to the comparison result to correct the position of the first type joint in the first skeleton information (step S240). Specifically, the processor 14/24 determines whether to use the second skeleton information to modify the first skeleton information according to the consistency between the first skeleton information and the second skeleton information. In an embodiment, in response to the comparison result being that the comparison between the first connection line and the corresponding second connection line is less than a threshold value, the processor 14/24 may adopt the second skeleton information to modify the first skeleton information. In response to the comparison result being that the comparison between the first connection line and the corresponding second connection line is not less than the threshold value, the processor 14/24 may reject the second skeleton information.

The comparison result is exemplified through the cosine similarity, and the processor 14/24 may compare whether the cosine similarity is less than a threshold value. If the cosine similarity is less than the threshold value, the processor 14/24 may determine that part of the skeleton joint of the first skeleton information matches the corresponding skeleton joint of the second skeleton information, and adopt the second skeleton information accordingly. If the cosine similarity is not less than the threshold value, the processor 14/24 may determine that part of the skeleton joint of the first skeleton information does not match the corresponding skeleton joint of the second skeleton information, and deny/reject/ignore the second skeleton information accordingly.

Figure 10:
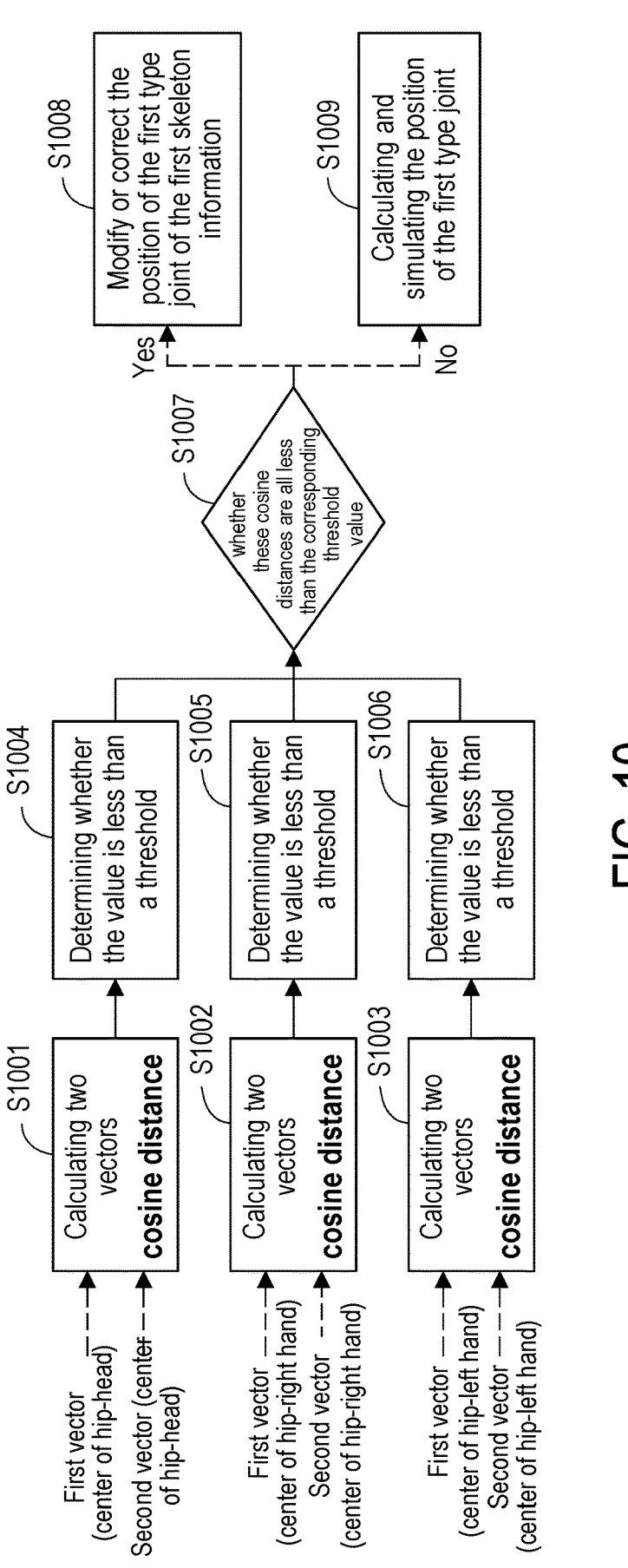
FIG. 10 is a flowchart of a correction decision according to an embodiment of the present disclosure.

For example, FIG. 10 is a flowchart of a correction decision according to an embodiment of the present disclosure. Please refer to FIG. 10, the reference joint is the hip center, and the target joints are the head, right hand and left hand. The processor 14/24 may calculate the cosine distances of the first vector (that is, the vector from the center of the hip to the head, the vector from the center of the hip to the right hand, and the vector from the center of the hip to the left hand in the first skeleton information) and the second vector (that is, the vector from the center of the hip to the head, the vector from the center of the hip to the right hand, and the vector from the center of the hip to the left hand in the second skeleton information) respectively (steps S1001, S1002, S1003), and respectively determine whether these cosine distances are less than the corresponding threshold value (steps S1004, S1005, S1006).

Next, the processor 14/24 determines whether these cosine distances are all less than the corresponding threshold value (step S1007). If these cosine distances are all less than the corresponding threshold value, the processor 14/24 may determine that part of the skeleton joint in the first skeleton information matches the corresponding skeleton joint in the second skeleton information, and adopts the skeleton joint in the second skeleton information to modify or correct the position of the first type joint in the first skeleton information (for example, corresponding to the skeleton joints P25-P32 of the lower body in FIG. 3 or the target parts directed by other sensors 21) (step S1008). If any one of these cosine distances is not less than the threshold value, the processor 14/24 may determine that part of the skeleton joint in the first skeleton information does not match the corresponding skeleton joint in the second skeleton information, and may calculate and simulate the position of the first type joint according to step S450 in FIG. 4 (for example, corresponding to the skeleton joints P25-P32 of the lower body in FIG. 3 or the target parts directed by other sensors 21) (step S1009). For example, the position of the skeleton joint of the lower body is predicted through the Pose AI model.

It should be noted that the steps in FIG. 10 are only used as an example, and different reference joints, target joints and comparison results may be adopted in other embodiments. For example, a vector from neck to head, a vector from left/right knee to left/right leg, a vector from left/right hip to left/right knee, a vector from left/right elbow to left/right hand, or a vector from left/right shoulder to left/right elbow.

In the fusion/correction of skeleton information, in an embodiment, the processor 14/24 may extend from the first joint in the first skeleton information according to the reference vector of the first joint and the second joint in the second skeleton information to modify the position of the second joint in the first skeleton information. Specifically, the human skeleton is an articulated structure. Assuming that the first joint is the starting point (i.e., the parent node) of the articulated structure, the position of the second joint (i.e., the child node) of the second skeleton information is defined as follows:

$$P'^{Mobile}_{joint} = P'^{Mobile}_{parent-joint} + \vec{V}^{Mobile}_{connect} * C_{connect} \tag{4}$$

$$P'^{Mobile}_{joint}$$

is the second joint, $$P'^{Mobile}_{parent-joint}$$

is the parent joint corresponding to the second joint (that is, the first joint), $$\vec{V}^{Mobile}_{connect}$$

is the direction vector of the second joint and the parent joint thereof, $C_{connect}$ is the length conversion coefficient, and the length conversion coefficient $C_{connect}$ is the length ratio between the first skeleton information and the second skeleton information. The coordinates of each target joint are the coordinates of the parent joint extended according to the direction vector. Therefore, the processor 14/24 may adopt the distance and direction in the vectors of the first joint and the second joint in the second skeleton information to modify the distance and direction in the vectors of the first joint and the second joint in the first skeleton information to retain the original motion direction. In addition, the distance of extension may be adjusted through the length conversion coefficient, and the connection distance between joints of skeleton may be adjusted while keeping the direction unchanged after referring to the vector direction. Because the human skeleton is an articulated structure, multiple vectors corresponding to multiple second joints of the second skeleton information may be obtained through defining the position of the formula (4). In other embodiments, the vector corresponding to the first type joint may be found from multiple vectors, and the vector corresponding to the first type joint may be brought into formula (5).

In an embodiment, after the vector is obtained, the position where the first joint of the first skeleton information extends outward for a certain distance is the position for correcting the second joint in the first skeleton information:

$$P'^{VR}_{joint} = P'^{VR}_{parent-joint} + \vec{V}^{Mobile}_{connect} * C_{connect} \tag{5}$$

The distance is the product of the reference vector $$\vec{V}^{Mobile}_{connect}$$

in the second skeleton information and the length conversion coefficient $C_{connect}$, and the length conversion coefficient $C_{connect}$ is the length ratio between the first skeleton information and the second skeleton information. In addition, $$P'^{VR}_{parent-joint}$$

is the position of the first joint (may be the first type joint or second type joint) in the first skeleton information, and $$P'^{VR}_{joint}$$

is the position for modifying the second joint (i.e., the child joint in the case of the first joint as the parent joint) in the first skeleton information.

With the center of the hip as the starting point of the articulated structure, the calculation sequence of the skeleton joint is, for example: 1. Left/right hip 2. Left/right knee 3. Left/right ankle 4. Left/right shoulder 5. Left/right elbow 6. Left/Right wrist 7. Neck 8. Head. That is to say, the parent joints are switched sequentially according to this order, and the corresponding child joints are determined accordingly. In this way, the position of the first-type fulcrum and even the second-type fulcrum may be modified. However, the starting point and sequence are not limited thereto.

In an embodiment, the processor 14/24 may convert the corrected/fused skeleton information into the body proportion of the avatar, and determine the pose of the avatar accordingly.

In an embodiment, the processor 14/24 may determine a length conversion coefficient between the first skeleton information and the second skeleton information at the reference pose. The description of the reference pose may be derived from the description of the conversion coefficient, and the details will not be repeated here. The processor 14/24 may define comparison connection lines. For example, the length from the head (for example, the midpoint between two ears) to the neck (for example, the midpoint between two shoulders), the length from the neck to the left/right shoulder, the length from the left/right shoulder to the left/right elbow, the length from the left/right elbow to the left/right wrist, the length from the left/right shoulder to the left/right hip, the midpoint of the length from the hip center (e.g., midpoint between two hips) to the left/right hip, the length from left/right hip to left/right knee, and/or the length from left/right knee to left/right ankle. The formula of the length conversion coefficient $C_{connect}$ is as follows:

$$C_{connect} = L^{VR}_{connect} / L^{Mobile}_{connect} \tag{6}$$

$$L^{VR}_{connect}$$

is the comparison length in the first skeleton information, and $$L^{Mobile}_{connect}$$

13 14 is the comparison length in the second skeleton information.

Taking the lengths of four body parts corresponding to the two arms in FIG. 9A as an example, the lengths are the length from the left/right shoulder to the left/right elbow, and the length from the left/right elbow to the left/right wrist. The calculation method of length conversion coefficient is as follows:

$$C_{right\_shoulder\_to\_elbow} = L^{VR}_{right\_shoulder\_to\_elbow}/L^{Mobile}_{right\_shoulder\_to\_elbow} \quad (7)$$

$$C_{left\_shoulder\_to\_elbow} = L^{VR}_{left\_shoulder\_to\_elbow}/L^{Mobile}_{left\_shoulder\_to\_elbow} \quad (8)$$

$$C_{right\_elbow\_to\_hand} = L^{VR}_{right\_elbow\_to\_hand}/L^{Mobile}_{right\_elbow\_to\_hand} \quad (9)$$

$$C_{left\_elbow\_to\_hand} = L^{VR}_{left\_elbow\_to\_hand}/L^{Mobile}_{left\_elbow\_to\_hand} \quad (10)$$

$C_{right\_shoulder\_to\_elbow}$ is the length conversion coefficient from the right shoulder to the right elbow, $$L^{VR}_{right\_shoulder\_to\_elbow}$$

is the length from the right shoulder to the right elbow in the first skeleton information, and $$L^{Mobile}_{left\_shoulder\_to\_elbow}$$

is the length from the right shoulder to the right elbow in the second skeleton information; $C_{left\_shoulder\_to\_elbow}$ is the length conversion coefficient from the right shoulder to the right elbow, $$L^{VR}_{left\_shoulder\_to\_elbow}$$

is the length from the left shoulder to the left elbow in the first skeleton information, and $$L^{Mobile}_{left\_shoulder\_to\_elbow}$$

is the length from the left shoulder to the left elbow in the second skeleton information; $C_{right\_elbow\_to\_hand}$ is the length conversion coefficient from the right shoulder to the right elbow, $$L^{VR}_{right\_shoulder\_to\_hand}$$

is the length from the left elbow to the left wrist in the first skeleton information, and $$L^{Mobile}_{right\_shoulder\_to\_hand}$$

is the length from the left elbow to the left wrist in the second skeleton information; $C_{left\_elbow\_to\_hand}$ is the length conversion coefficient from the right shoulder to the right elbow, $$L^{VR}_{left\_shoulder\_to\_hand}$$

is the length from the right elbow to the right wrist in the first skeleton information, and $$L^{Mobile}_{left\_shoulder\_to\_hand}$$

is the length from the right elbow to the right wrist in the second skeleton information.

Similarly, length conversion coefficients of other comparison lengths may be obtained. In some application scenarios, the mobile device 10 and/or the virtual reality device 20 may further prompt the user to pose other reference poses (for example, Phi pose), so that tracking of a specific comparison length (for example, the length from the elbow to the wrist or the length from the hip to the knee) is more accurate.

In an embodiment, the processor 14/24 may determine whether there is a length conversion coefficient. If there is no length conversion coefficient, the user may be guided to pose a reference pose, and the length conversion coefficient may be calculated accordingly.

Another embodiment of the present disclosure provides a computer-readable medium, which records a computer program loaded into a processor to execute various steps of the above-mentioned skeleton correction method (the embodiments shown in FIG. 2 to FIG. 10). The computer program may include a plurality of program codes, and after the processor 14/24 loads and executes these program codes, it is possible to achieve the above-mentioned skeleton correction method and realize the functions of the virtual reality system 1.

To sum up, in the method for correcting the skeleton of the avatar, the virtual reality system and the computer-readable medium in the embodiments of the present disclosure, the skeleton information is modified according to the consistency of the two skeleton information on part of skeleton joints. In this way, the accuracy of positioning human body part may be improved.

Although the present disclosure has been disclosed above with embodiments, it is not intended to limit the present disclosure. Anyone with ordinary knowledge in the technical field can make some changes and modifications without departing from the spirit and scope of the present disclosure. Therefore, the scope to be protected by the present disclosure shall be determined by the scope of the appended claims.

What is claimed is:

1. A skeleton correction method of an avatar, comprising:
obtaining a first skeleton information, wherein a first type joint of the first skeleton information is estimated according to a second type joint;
obtaining a second skeleton information, wherein the first type joint and the second type joint of the second skeleton information are determined based on an image;
comparing the first skeleton information with the second skeleton information to obtain a comparison result;
determining a reference vector as a vector of a first joint and a second joint in the second skeleton information, wherein the first joint is a parent joint of the second joint in the second skeleton information; and in response to verifying that the second skeleton information is usable as a reference based on the comparison result, extending from a first joint belonging to the first type joint in the first skeleton information according to the reference vector of a first joint and a second joint belonging to the first type joint in the second skeleton information to modify a position of a second joint belonging to the first type joint in the first skeleton information, comprising:

modifying a vector of a first joint and a second joint in the first skeleton information by using the reference vector, wherein the first joint is a parent joint of the second joint in the first skeleton information, a modified position of the second joint in the first skeleton information is extend from a position of the first joint in the first skeleton information according to the reference vector of the first joint and the second joint in the second skeleton information in which a direction of a modified vector of the first joint and the second joint in the first skeleton information is same as a direction of the reference vector.

2. The skeleton correction method of the avatar according to claim 1, wherein comparing the first skeleton information with the second skeleton information comprises:

obtaining a first spatial position of the second type joint from the first skeleton information;

obtaining a second spatial position of the second type joint from the second skeleton information; and comparing the first spatial position with the second spatial position.

3. The skeleton correction method of the avatar according to claim 2, wherein the second type joint comprises at least one target joint, and comparing the first spatial position with the second spatial position comprises:

determining at least one first connection line between a reference joint and the at least one target joint in the first skeleton information according to the first spatial position;

determining at least one second connection line between the reference joint and the at least one target joint in the second skeleton information according to the second spatial position; and comparing the at least one first connection line with the at least one second connection line.

4. The skeleton correction method of the avatar according to claim 3, wherein the at least one first connection line forms at least one first vector, and the at least one second connection line forms at least one second vector, and comparing the at least one first connection line with the at least one second connection line comprises:

determining a similarity between the at least one first vector and the at least one second vector.

5. The skeleton correction method of the avatar according to claim 4, wherein the first type joint belongs to a lower body, the second type joint belongs to an upper body, the reference joint is a hip center joint, the at least one target joint comprises a left-hand joint, a right-hand joint and a head joint, and the similarity is a cosine similarity.

6. The skeleton correction method of the avatar according to claim 3, wherein comparing the first skeleton information with the second skeleton information comprises:

determining the comparison result according to the comparison between the at least one first connection line and the at least one second connection line;

in response to the comparison result being that the comparison between the at least one first connection line and the at least one second connection line is less than a threshold value, adopting the second skeleton information to modify the first skeleton information; and in response to the comparison result being that the comparison between the at least one first connection line and the at least one second connection line is not less than the threshold value, rejecting the second skeleton information.

7. The skeleton correction method of the avatar according to claim 1, wherein a position where the first joint of the first skeleton information extends outward for a distance is the position for correcting the second joint in the first skeleton information, and the distance is a product of the reference vector in the second skeleton information and a length conversion coefficient, and the length conversion coefficient is a length ratio between the first skeleton information and the second skeleton information.

8. The skeleton correction method of the avatar according to claim 1, wherein comparing the first skeleton information with the second skeleton information comprises:

converting the second skeleton information into a coordinate system to which the first skeleton information belongs.

9. The skeleton correction method of the avatar according to claim 8, wherein converting the second skeleton information into the coordinate system to which the first skeleton information belongs comprises:

determining a coordinate correspondence between the first skeleton information and the second skeleton information in a reference pose, wherein a coordinate conversion of the second skeleton information is based on the coordinate correspondence, and the reference pose is a T pose or a Phi pose.

10. A virtual reality system, comprising:

an image capturing device, configured to capture an image;

a sensor, configured to detect a motion status;

a processor, configured to communicate with the image capturing device and the sensor and execute the following operations:

obtaining a first skeleton information, wherein a first type joint of the first skeleton information is estimated according to a second type joint; and the second type joint of the first skeleton information is determined based on a sensing data of the sensor;

obtaining a second skeleton information, wherein the first type joint and the second type joint of the second skeleton information are determined based on the image;

comparing the first skeleton information with the second skeleton information to obtain a comparison result;

determining a reference vector as a vector of a first joint and a second joint in the second skeleton information, wherein the first joint is a parent joint of the second joint in the second skeleton information; and in response to verifying that the second skeleton information is usable as a reference based on the comparison result, extending from a first joint belonging to the first type joint in the first skeleton information according to the reference vector of a first joint and a second joint belonging to the first type joint in the second skeleton information to modify a position of a second joint belonging to the first type joint in the first skeleton information, comprising:

modifying a vector of a first joint and a second joint in the first skeleton information by using the reference vector, wherein the first joint is a parent joint of the second joint in the first skeleton information, a modified position of the second joint in the first skeleton information is extend from a position of the first joint in the first skeleton information according to the reference vector of the first joint and the second joint in the second skeleton information in which a direction of a modified vector of the first joint and the second joint in the first skeleton information is same as a direction of the reference vector.

11. The virtual reality system according to claim 10, wherein the processor is further configured to:
obtain a first spatial position of the second type joint from the first skeleton information;
obtain a second spatial position of the second type joint from the second skeleton information; and
compare the first spatial position with the second spatial position.

12. The virtual reality system according to claim 11, wherein the second type joint comprises at least one target joint, and the processor is further configured to:
determine at least one first connection line between a reference joint and the at least one target joint in the first skeleton information according to the first spatial position;
determine at least one second connection line between the reference joint and the at least one target joint in the second skeleton information according to the second spatial position; and
compare the at least one first connection line with the at least one second connection line.

13. The virtual reality system according to claim 12, wherein the at least one first connection line forms at least one first vector, and the at least one second connection line forms at least one second vector, and the processor is further configured to:
determine a similarity between the at least one first vector and the at least one second vector, wherein the first type joint belongs to a lower body, the second type joint belongs to an upper body, the reference joint is a hip center joint, the at least one target joint comprises a left-hand joint, a right-hand joint and a head joint, and the similarity is a cosine similarity.

14. The virtual reality system according to claim 12, wherein the processor is further configured to:
determine the comparison result according to the comparison between the at least one first connection line and the at least one second connection line;
in response to the comparison result being that the comparison between the at least one first connection line and the at least one second connection line is less than a threshold value, adopting the second skeleton information to modify the first skeleton information; and
in response to the comparison result being that the comparison between the at least one first connection line and the at least one second connection line is not less than the threshold value, rejecting the second skeleton information.

15. The virtual reality system according to claim 10, wherein a position where the first joint of the first skeleton information extends outward for a distance is the position for correcting the second joint in the first skeleton information, and the distance is a product of the reference vector in the second skeleton information and a length conversion coefficient, and the length conversion coefficient is a length ratio between the first skeleton information and the second skeleton information.

16. The virtual reality system according to claim 10, wherein the processor is further configured to:
convert the second skeleton information into a coordinate system to which the first skeleton information belongs.

17. The virtual reality system according to claim 16, wherein the processor is further configured to:
determine a coordinate correspondence between the first skeleton information and the second skeleton information in a reference pose, wherein a coordinate conversion of the second skeleton information is based on the coordinate correspondence, and the reference pose is a T pose or a Phi pose.

18. A non-transitory computer-readable medium, which loads program codes through a processor to perform the following operations:
obtaining a first skeleton information, wherein a first type joint of the first skeleton information is estimated according to a second type joint;
obtaining a second skeleton information, wherein the first type joint and the second type joint of the second skeleton information are determined based on an image;
comparing the first skeleton information with the second skeleton information to obtain a comparison result;
determining a reference vector as a vector of a first joint and a second joint in the second skeleton information, wherein the first joint is a parent joint of the second joint in the second skeleton information; and
in response to verifying that the second skeleton information is usable as a reference based on the comparison result, extending from a first joint belonging to the first type joint in the first skeleton information according to the reference vector of a first joint and a second joint belonging to the first type joint in the second skeleton information to modify a position of a second joint belonging to the first type joint in the first skeleton information, comprising:
modifying a vector of a first joint and a second joint in the first skeleton information by using the reference vector, wherein the first joint is a parent joint of the second joint in the first skeleton information, a modified position of the second joint in the first skeleton information is extend from a position of the first joint in the first skeleton information according to the reference vector of the first joint and the second joint in the second skeleton information in which a direction of a modified vector of the first joint and the second joint in the first skeleton information is same as a direction of the reference vector.

* * * * *